US012797744B2

(12) United States Patent
Wan et al.

(10) Patent No.: US 12,797,744 B2
(45) Date of Patent: Nov. 17, 2026

(54) GENERATING VIRTUAL AVATAR PIECES FOR AN ANIMATION RIG USING AN ARTFICIAL INTELLIGENCE AVATAR GENERATION ENGINE

(71) Applicant: Astroblox Inc., Los Altos, CA (US)

(72) Inventors: Ziniu Wan, Sunnyvale, CA (US); Alex Michael Varanese, Campbell, CA (US); Ali Sadeghian, Los Altos, CA (US); Amir Sadeghian, Los Altos, CA (US)

(73) Assignee: Astroblox Inc., Los Altos, CA (US)

( * ) Notice: Subject to any disclaimer, the term of this patent is extended or adjusted under 35 U.S.C. 154(b) by 0 days.

(21) Appl. No.: 19/183,435

(22) Filed: Apr. 18, 2025

(65) Prior Publication Data

US 2026/0151708 A1 Jun. 4, 2026

Related U.S. Application Data

(60) Provisional application No. 63/712,323, filed on Oct. 25, 2024.

(51) Int. Cl.
*A63F 13/63* (2014.01)
*A63F 13/533* (2014.01)
(Continued)

(52) U.S. Cl.
CPC ............ *A63F 13/63* (2014.09); *A63F 13/533* (2014.09); *A63F 13/55* (2014.09); *A63F 13/655* (2014.09);
(Continued)

(58) Field of Classification Search
CPC .. A63F 2300/5553; A63F 13/52; A63F 13/79; A63F 13/213; A63F 13/56; A63F 13/655; A63F 13/65; A63F 13/35; A63F 13/69; A63F 2300/6607; A63F 13/60; A63F 13/73; A63F 13/63; A63F 13/67; A63F 13/77; A63F 13/55; G06T 13/00; G06N 20/00; G06V 2201/10; G06V 40/172
See application file for complete search history.

(56) References Cited

U.S. PATENT DOCUMENTS

2023/0351643 A1* 11/2023 Tanaka ................. G06V 10/764
2023/0394734 A1* 12/2023 Marquis Bolduc ..... A63F 13/56
(Continued)

OTHER PUBLICATIONS

Insights in Coding with Duncan, “The Hello World of Generative AI: Exploring Retrieval Augmented Generation” , Mar. 1, 2024, roosma.dev,<https://roosma.dev/p/generative-ai-hello-world/> (Year: 2024).*

*Primary Examiner* — Justin L Myhr
(74) *Attorney, Agent, or Firm* — Ashurst Perkins Coie US LLP; Colin Fowler; Aidan Faustina

(57) ABSTRACT

Disclosed herein are methods and non-transitory, computer-readable storage media for employing an artificial intelligence (AI) avatar generation engine to generate a virtual avatar in a video game. A wish, or a natural language input describing a desired virtual avatar, is received from a player. The AI avatar generation engine is directed to generate the virtual avatar based on the wish. One or more pieces of the virtual avatar that fit within one or more bounding boxes, as well as a size for the one or more bounding boxes, are received from the AI avatar generation engine.

20 Claims, 10 Drawing Sheets

(51) Int. Cl.

| | |
|---|---|
| ***A63F 13/55*** | (2014.01) |
| ***A63F 13/655*** | (2014.01) |
| ***A63F 13/67*** | (2014.01) |
| ***G06T 13/00*** | (2011.01) |

(52) U.S. Cl.
CPC .............. *A63F 13/67* (2014.09); *G06T 13/00* (2013.01); *G06T 2200/24* (2013.01); *G06T 2210/12* (2013.01)

(56) References Cited

U.S. PATENT DOCUMENTS

| | | | | |
|---|---|---|---|---|
| 2024/0226750 | A1* | 7/2024 | Benedetto | A63F 13/213 |
| 2024/0233231 | A1* | 7/2024 | Taylor | G06F 3/011 |
| 2024/0386015 | A1* | 11/2024 | Crabtree | G06F 16/9024 |
| 2025/0050226 | A1* | 2/2025 | Escalera | A63F 13/69 |

* cited by examiner

700

800

GENERATING VIRTUAL AVATAR PIECES FOR AN ANIMATION RIG USING AN ARTFICIAL INTELLIGENCE AVATAR GENERATION ENGINE

CROSS-REFERENCE TO RELATED APPLICATIONS

This application claims the benefit of priority to U.S. Provisional Application No. 63/712,323, titled "VIDEO GAME CHARACTER MODEL GENERATOR," filed on Oct. 25, 2024. The content of the aforementioned application is herein incorporated by reference in its entirety.

TECHNICAL FIELD

The disclosure relates to artificial intelligence and, more particularly, to using artificial intelligence for creating a virtual avatar in a video game.

BACKGROUND

Video games are a popular form of entertainment, with each game offering a distinct experience. Many video games involve the creation of an avatar, or a character chosen by a player to be the visual representation of that player within the game. In some instances, a player's avatar will also be the in-game character that the player controls during gameplay. Avatars that are visually appealing and customized to a player's preferences enhance the gameplay experience, as players are more satisfied with and feel more of a connection to such avatars.

Artificial intelligence ("AI") models often operate based on extensive and enormous training models. The models include a multiplicity of inputs and how each should be handled. Then, when the model receives a new input, the model produces an output based on patterns determined from the data the model was trained on.

Diffusion models are generative AI models that can generate new data based on training data. Diffusion models are trained using large datasets of images to enable them to generate new images from text prompts. One example of an existing diffusion model is Dall-E 2. Diffusion models make use of a natural language chat interface for humans to make requests to the AI.

DETAILED DESCRIPTION

Figure 1:
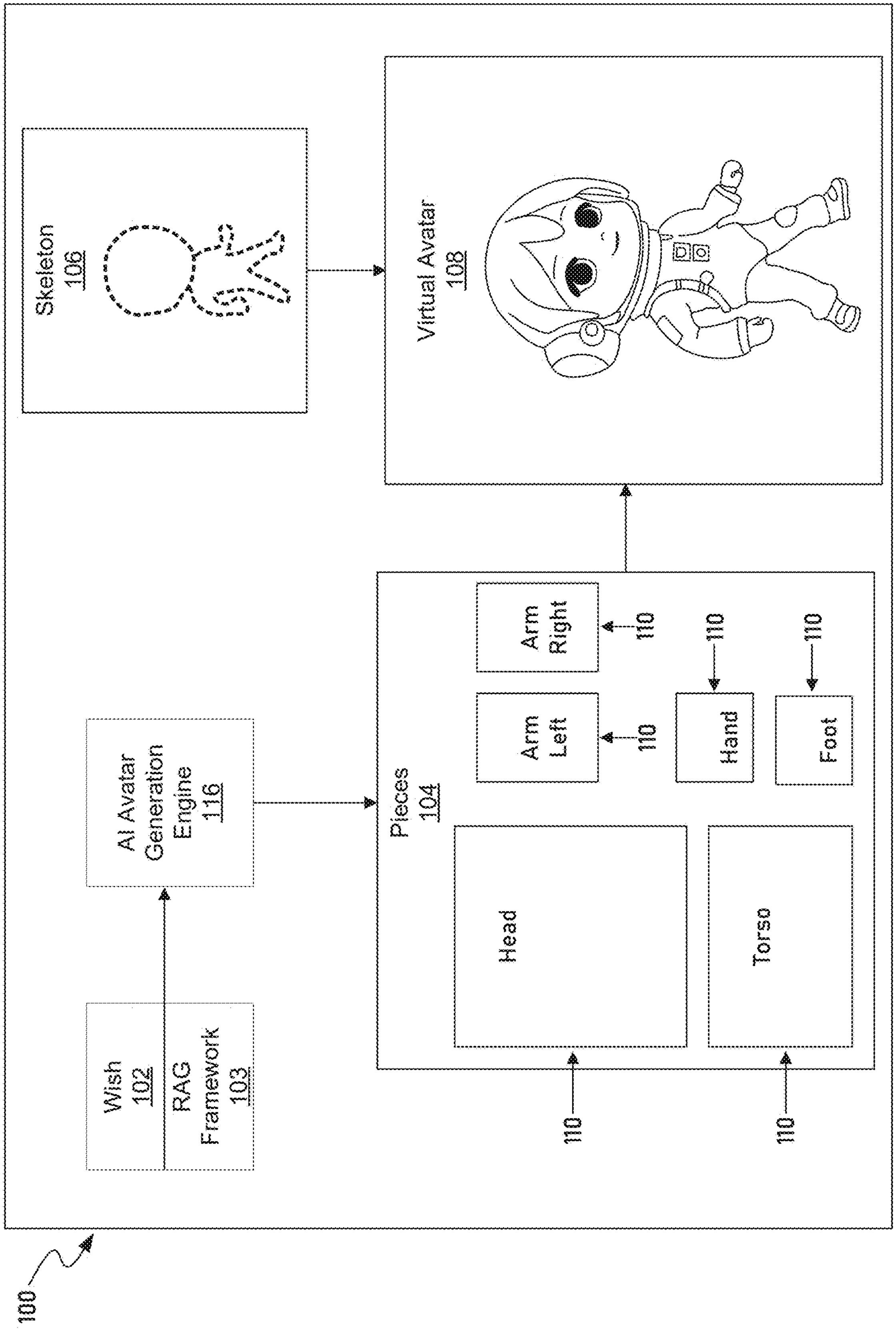
FIG. 1 is a block diagram illustrating an example avatar generation system, in accordance with one or more embodiments.

Despite virtual avatars being a central part of the gameplay experience in many video games, the freedom of players to customize their own avatars in a video game is often limited. In many video games, players must select their avatar from a set of possible avatars provided by the game developers. Some video games do allow players to create their own avatars, but such games typically fall into one of two categories, each with its own limitations. In the first category of video game, players are provided with in-game avatar creation tools, which allow for customization but only within the predetermined boundaries set by the game developers. In the second category of video game, players are free to use their own avatar creation tools, which allows for more flexibility in avatar design but requires players to know how to code such a tool themselves and/or know how to install and implement a third-party tool into a video game.

The integration of generative AI technology into avatar customization enables these limitations to be overcome. AI technology can be harnessed to produce an extensive range of virtual avatars based on diverse input data. In response to receiving a "wish," or a text query received from a player describing what the player would like the AI engine to generate an AI engine generates an avatar that matches the player's specifications and that, in cases where the avatar is the in-game character controlled by the player, is smoothly animated for visually appealing gameplay. For example, the AI engine is directed toward the visual characteristics required to satisfy the wish using a Retrieval-Augmented Generation (RAG) framework. The RAG framework combines retrieval-based and generation-based models (e.g., large language models ("LLMs")), allowing the system to fetch relevant information from a pre-compiled database of virtual visual designs and subsequently direct the AI engine to generate new virtual avatars using the information. Using a RAG framework ensures that players with various degrees of familiarity with graphic design and AI prompt engineering are able to direct the AI engine to create virtual avatars that satisfy their personal preferences and have visual properties that allow for smooth and visually appealing animation.

The AI engine not only simplifies the avatar creation process but also allows for more variety than traditional avatar generation methods. For example, many video games allow for the "skin" of an avatar to be modified, which changes the color of the avatar's model without changing its shape or dimensions. The AI engine, however, would be able to modify the shape and dimensions of the avatar to satisfy a wish, allowing for the addition of more variety and detail than the traditional method of simply modifying a skin.

A technical challenge that arises when allowing for avatars with different shapes and dimensions to be created is ensuring those dimensions are bounded such that any avatar that is generated is animated in a way that is smooth and avoids clipping, or the overlap of visual elements such that they obscure one another in an unnatural way. The AI engine solves this problem by selecting one of several predetermined animation rigs, or "skeletons," that determine how the avatar will move when animated and by generating the visual components of the avatar in a series of pieces to be aligned with the skeleton. Each piece is constrained to fit within a bounding box, the size and shape of which are determined by the training of the AI engine and chosen such that, when the pieces are aligned with the skeleton and animated, clipping will not occur and the overall visual appearance will be appealing.

The invention is implemented in numerous ways, including as a process; an apparatus; a system; a composition of matter; a computer program product embodied on a computer-readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

A detailed description that references the accompanying figures follows. The scope of the invention is limited only by the claims, and the invention encompasses numerous alternatives, modifications, and equivalents. Numerous specific details are set forth in the following description in order to provide a thorough understanding of the disclosure. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Avatar Generation System

FIG. 1 is a block diagram illustrating an example avatar generation system 100, in accordance with one or more embodiments. The avatar generation system 100 generates a virtual avatar 108 after receiving a wish 102 submitted by a player. The player's wish 102 may be received via one of the interfaces discussed in FIG. 2 below.

As shown in FIG. 1, a wish 102 is processed using a RAG framework 103, which relies on a pre-compiled database of virtual visual designs to direct the AI avatar generation engine 116 towards the visual components of the virtual avatar 108 that the player requested in the wish 102. The AI avatar generation engine 116 then generates pieces 104, which provide the requested visual components of the virtual avatar 108. In some embodiments, the number and type of pieces 104 generated by the AI avatar generation engine 116 depend on the content of the wish 102. For example, a wish 102 corresponding to a humanoid avatar will lead to the generation of pieces 104 corresponding to human anatomy, such as a head, torso, arm, hand, and foot.

The pieces 104 are then aligned with a predetermined animation rig, or skeleton 106, which specifies how each piece will be aligned with respect to the other pieces and provides information dictating the approximate size and proportions of the virtual avatar 108. The skeleton 106 also determines how the pieces 104 will move when the virtual avatar 108 is animated by fixing the points of movement around which the pieces 104 will rotate and bend during animation. For example, when a wish 102 for a humanoid virtual avatar 108 is received, a piece 104 is generated representing a head, and that piece 104 is added to a skeleton 106 representing a human anatomy in the place corresponding to where a head would be located on a human body. The skeleton 106 may further include data indicating the location of a "neck" joint around which the head piece 104 rotates during animation.

In some embodiments, the skeleton 106 will be selected from a plurality of presets including humanoid anatomies as well as shapes representing nonhuman anatomies. As an example of a nonhuman anatomy, large birds tend to have large, elongated feet and ankle joints that sit high above the ground in comparison to those of a human, creating the appearance of a "knee" that bends backwards when the large bird moves. Thus, a skeleton 106 with a high, backwards-being point of movement along the "leg" may be included among the presets to allow for the more realistic animation of virtual avatars 108 that resemble large birds.

To ensure the pieces 104 fit onto the skeleton 106 and animate smoothly without causing clipping, each piece 104 is constrained to fit within a bounding box 110. In some embodiments, the size and shape of each bounding box 110 are not preset by the video game developers or player but are instead determined based on the direction given to the AI avatar generation engine 116. For example, the AI avatar generation engine 116 may be provided with example visual designs from a RAG framework 103 or a custom algorithm generated using feedback on previous applications of the AI avatar generation engine 116. These example visual designs or custom algorithms guide the AI avatar generation engine 116 in determining a size and shape of each bounding box 110 that will avoid clipping and allow for a visually appealing appearance overall.

Network Environment

Figure 2:
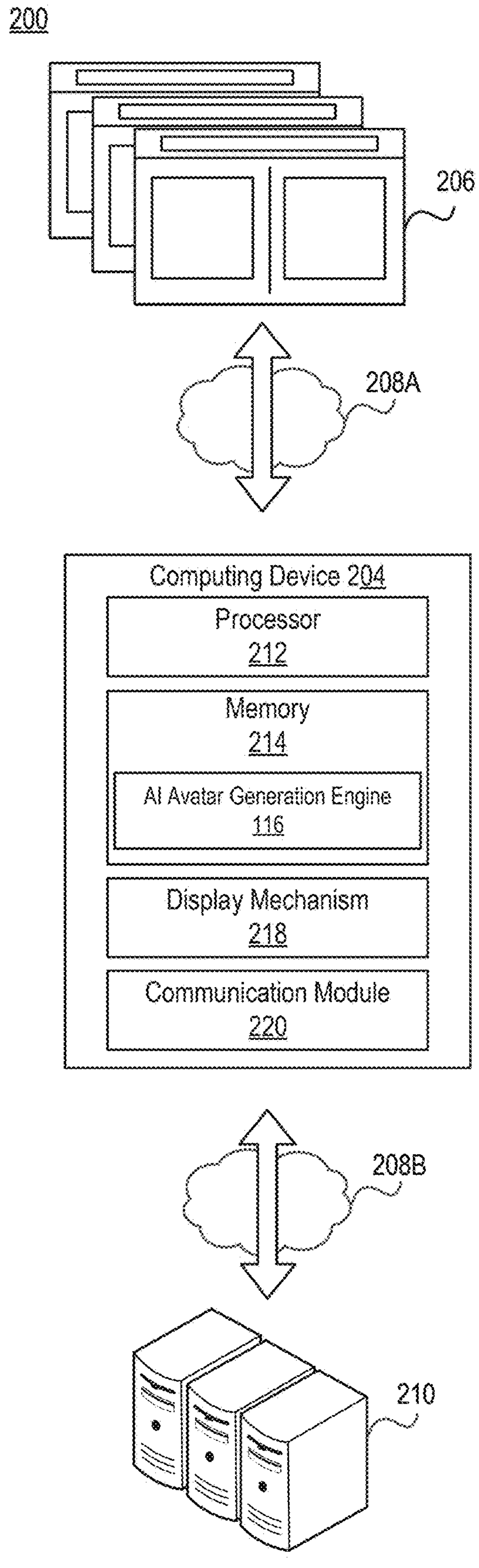
FIG. 2 is an example of a network environment that includes a game building engine, according to an embodiment of the disclosed technology.

FIG. 2 illustrates an example of a network environment 200 that includes an AI avatar generation engine 116, in accordance with one or more embodiments. In some embodiments, players interact with the AI avatar generation engine 116 via interfaces 206, as further discussed below. For example, players may be able to access interfaces 206 that are designed to receive wishes 102 describing a desired virtual avatar 108. The interfaces 206 present virtual avatars 108 generated by an AI model, and players provide feedback regarding the avatars 108 such that the AI model improves its avatar generation based on the feedback.

As shown in FIG. 2, the AI avatar generation engine 116 may reside in a network environment 200. Thus, the computing device 204 on which the AI avatar generation engine 116 is executing may be connected to one or more networks 208A-B. The networks 208A-B can include personal area networks (PANs), local area networks (LANs), wide area networks (WANs), metropolitan area networks (MANs), cellular networks, the Internet, etc. Additionally or alternatively, the computing device 204 can be communicatively coupled to other computing devices over a short-range wireless connectivity technology, such as Bluetooth®, Near Field Communication (NFC), Wi-Fi® Direct (also referred to as "Wi-Fi P2P"), and the like. For example, if the computing device 204 is a mobile phone, then the computing device 204 may be connected to a computer server of a server system 210 via the Internet. As another example, if the computing device 204 is a server system 210, then the computing device 204 may be accessible to players via respective computing devices that are connected to the Internet via LANs.

The interfaces 206 may be accessible via a web browser, desktop application, mobile application, or over-the-top (OTT) application. For example, a player may be able to access interfaces 206 that are designed to receive wishes 102, present generated game content, receive feedback regarding game content, and the like. Accordingly, the interfaces 206 may be viewed on various computing devices 204 depending on the nature of the AI avatar generation engine 116 and its deployment. Examples of computing devices 204 include desktop computers, laptop computers, tablet computers, mobile phones, wearable electronic devices (e.g., watches or other accessories), mobile workstations (also referred to as "computer carts"), network-connected electronic devices (e.g., televisions or home assistant devices), virtual or augmented reality systems (e.g., head-mounted displays), and the like.

Generally, the AI avatar generation engine 116 is hosted, at least partially, on the computing device 204 that is responsible for generating and/or displaying game content, as further discussed below. For example, the AI avatar generation engine 116 may be embodied as a mobile application executing on a mobile phone or tablet computer. In such embodiments, the instructions that, when executed, implement the AI avatar generation engine 116 may reside largely or entirely on the mobile phone or tablet computer. Note, however, that the mobile application may be able to access a server system 210 on which other aspects of the AI avatar generation engine 116 are hosted.

In some embodiments, aspects of the AI avatar generation engine 116 are executed by a cloud computing service operated by, for example, Amazon Web Services®, Google Cloud Platform™, or Microsoft Azure®. Accordingly, the computing device 204 may be representative of a computer server that is part of a server system 210. Often, the server system 210 comprises multiple computer servers. These computer servers can include information regarding computer-implemented models (or simply "models") that generate game content based on user-input wishes 102.

The computing device 204 can include a processor 212, memory 214, and display mechanism 218. In some embodiments, the computing device 204 can include additional or alternative components to those shown in FIG. 2. Each of these components is discussed in greater detail below.

Those skilled in the art will recognize that different combinations of these components may be present depending on the nature of the computing device 204. For example, if the computing device 204 is a computer server that is part of a server system (e.g., server system 210 of FIG. 2), then the computing device 204 may not include the display mechanism 218, though the computing device 204 may be communicatively connectable to another computing device that does include a display mechanism 218.

The processor 212 can have generic characteristics similar to general-purpose processors, or the processor 212 may be an application-specific integrated circuit (ASIC) that provides control functions to the computing device 204. The processor 212 can be coupled to all components of the computing device 204, either directly or indirectly, for communication purposes.

The memory 214 may comprise any suitable type of storage medium, such as static random-access memory (SRAM), dynamic random-access memory (DRAM), electrically erasable programmable read-only memory (EEPROM), flash memory, or registers. In addition to storing instructions that can be executed by the processor 212, the memory 214 can also store data generated by the processor 212 (e.g., when executing the modules of the AI avatar generation engine 116) and produced, retrieved, or obtained by the other components of the computing device 204. Note that the memory 214 is merely an abstract representation of a storage environment. The memory 214 could comprise actual memory integrated circuits (also referred to as "chips").

The display mechanism 218 can be any mechanism that is operable to visually convey information to a player. For example, the display mechanism 218 may be a panel that includes light-emitting diodes ("LEDs"), organic LEDs, liquid crystal elements, or electrophoretic elements. In some embodiments, the display mechanism 218 is touch-sensitive. Thus, a player may be able to provide input to the AI avatar generation engine 116 by interacting with the display mechanism 218. Alternatively, the player may be able to provide input to the AI avatar generation engine 116 through some other control mechanism communicatively coupled to the computing device 204.

The communication module 220 may be responsible for managing communications external to the computing device 204. For example, the communication module 220 may be responsible for managing communications with other computing devices (e.g., server system 210). The communication module 220 may be wireless communication circuitry that is designed to establish communication channels with other computing devices. Examples of wireless communication circuitry include 2.4 gigahertz ("GHz") and 5 GHz chipsets compatible with Institute of Electrical and Electronics Engineers ("IEEE") 802.11—also referred to as "Wi-Fi chipsets." Alternatively, the communication module 220 may be representative of a chipset configured for Bluetooth®, Near Field Communication ("NFC"), and the like. Some computing devices—like mobile phones and tablet computers—are able to wirelessly communicate via separate channels. Accordingly, the communication module 220 may be one of multiple communication modules implemented in the computing device 204.

For convenience, the AI avatar generation engine 116 may be referred to as a computer program that resides within the memory 214. However, the AI avatar generation engine 116 could comprise software, firmware, or hardware implemented in, or accessible to, the computing device 204. The AI avatar generation engine 116 runs on a computing device 204 to generate a virtual avatar 108 based on a wish 102. In some embodiments, the AI avatar generation engine 116 runs fully or partially on a computing device 204 or a server. However, for simplicity, the following description of the AI avatar generation engine 116 is described in relation to running on the computing device 204.

Avatar Generation Method Flow Diagram

Figure 3:
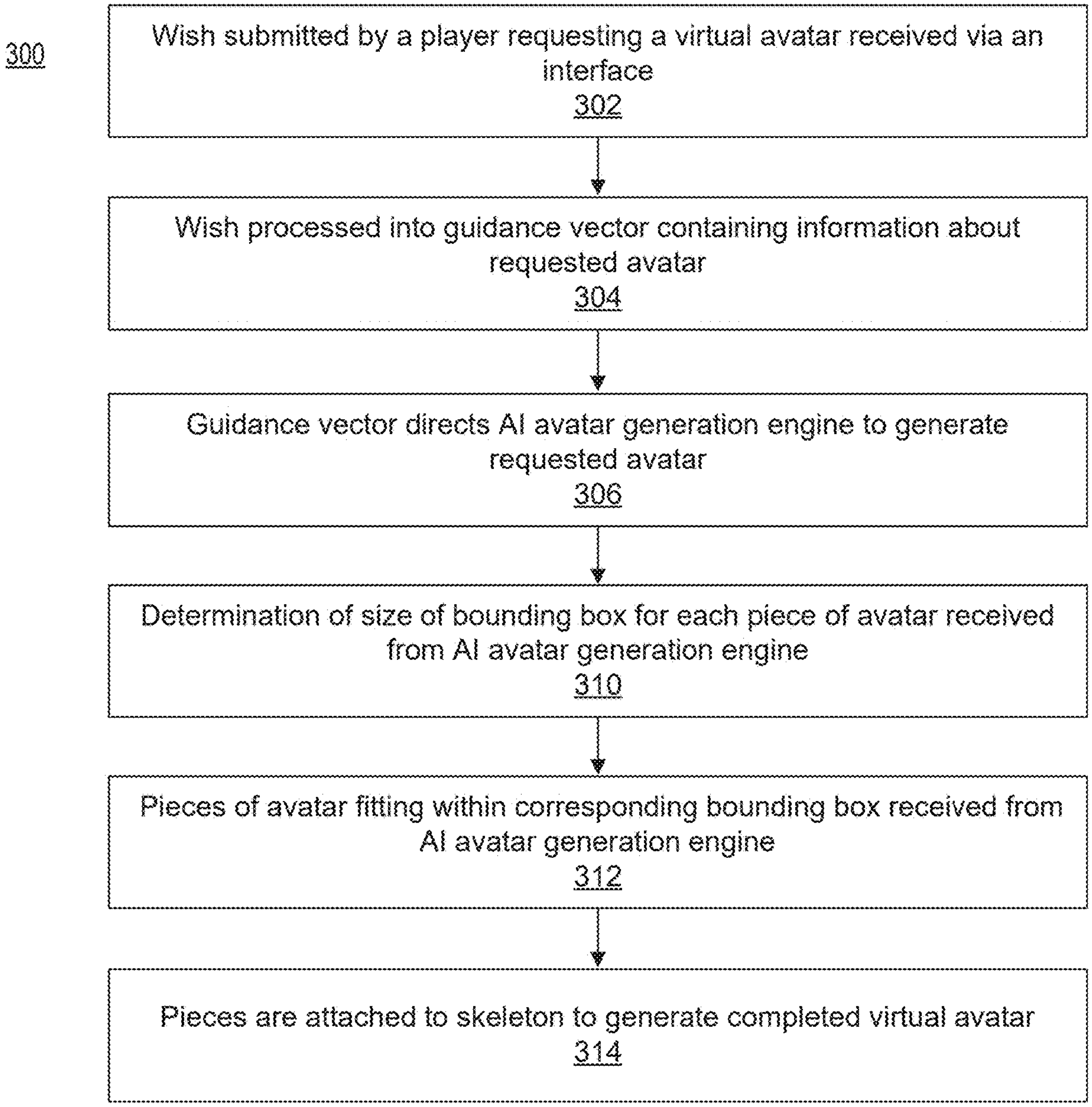
FIG. 3 is a flow diagram illustrating steps involved in an example generic avatar generation method, in accordance with one or more embodiments.

FIG. 3 is a flow diagram illustrating steps involved in an example generic avatar generation method 300, in accordance with one or more embodiments. In step 302, a wish 102, which is a text query requesting a virtual avatar 108 of a certain kind, is received from a player via an interface 206. Subsequently, in step 304, the wish 102 is processed into a guidance vector, which contains data representing the visual characteristics of the virtual avatar 108 requested in the wish. In some embodiments, this processing involves tokenizing the wish 102, or breaking up the concepts expressed in the wish 102 into a sequence of text tokens, and then augmenting the token sequence with additional information that, when provided to the AI avatar generation engine 116, enables the AI avatar engine 116 to interpret the visual characteristics associated with each token. For example, the token sequence may be augmented using a RAG framework 103, NLP and metadata tags, a language-image neural network such as CLIP, or a combination of one or more of these methods.

Subsequently, in step 306, the guidance vector directs the AI avatar generation engine 116 towards the components necessary to create and animate a virtual avatar 108 that would satisfy the wish 102. For example, the data contained in the guidance vector provides the AI avatar generation engine 116 with a means of comparing the wish 102 to a database of vectors representing images and thereby identifying an image most closely matching the request in the wish 102 to use as a model for the visual appearance of the virtual avatar 108. Subsequently, in step 310, the size and shape of the bounding box 110 for each piece 104 are received from the AI avatar generation engine 116. The size and shape of each bounding box 110 are not preset by the video game developers or player but are instead determined based on direction provided to the AI avatar generation engine 116. For example, the AI avatar generation engine 116 may be provided with example visual designs from a RAG framework 103 or a custom algorithm generated using feedback on previous applications of the AI avatar generation engine 116. These example visual designs or custom algorithms guide the AI avatar generation engine 116 in determining a size and shape of each bounding box 110 that will avoid clipping and allow for a visually appealing appearance overall. For example, the example visual designs or custom algorithms may guide the AI avatar generation engine 116 by indicating an example bounding box (e.g., a previously generated bounding box with predetermined dimensions), which the AI avatar generation engine 116 may use as the basis for future bounding boxes. Next, a series of generated pieces 104 comprising the visual components of the requested avatar 108 are received from the AI avatar generation engine 116 in step 312, with each piece 104 being constrained to fit within the corresponding bounding box 110. The number and type of pieces 104 received are tailored to the type of virtual avatar 108 requested in the wish 102. For example, if the requested avatar 108 is a human, the pieces 104 will at least include a piece 104 corresponding to a human head, torso, arm, hand, and foot.

Subsequently, the generated pieces 104 are aligned with a skeleton 106 in step 314 to generate a completed virtual avatar 108. The skeleton 106 provides predetermined information indicating how the pieces 104 will be arranged spatially with respect to one another, as well as information dictating how those pieces 104 will move in relation to one another. In some embodiments, more than one set of pieces 104 may be generated, allowing more than one completed virtual avatar 108 to be assembled. However, in such an embodiment, each set of pieces 104 will always be aligned with the same skeleton 106, allowing for consistent animated appearances between virtual avatars 108. Each completed virtual avatar 108 will satisfy the wish 102 but will vary to some degree from the others. The player may select one virtual avatar 108 among those generated to be the player's in-game representation. An example of an avatar selection interface that may be used in such an embodiment is provided in FIG. 6 below.

Figure 4:
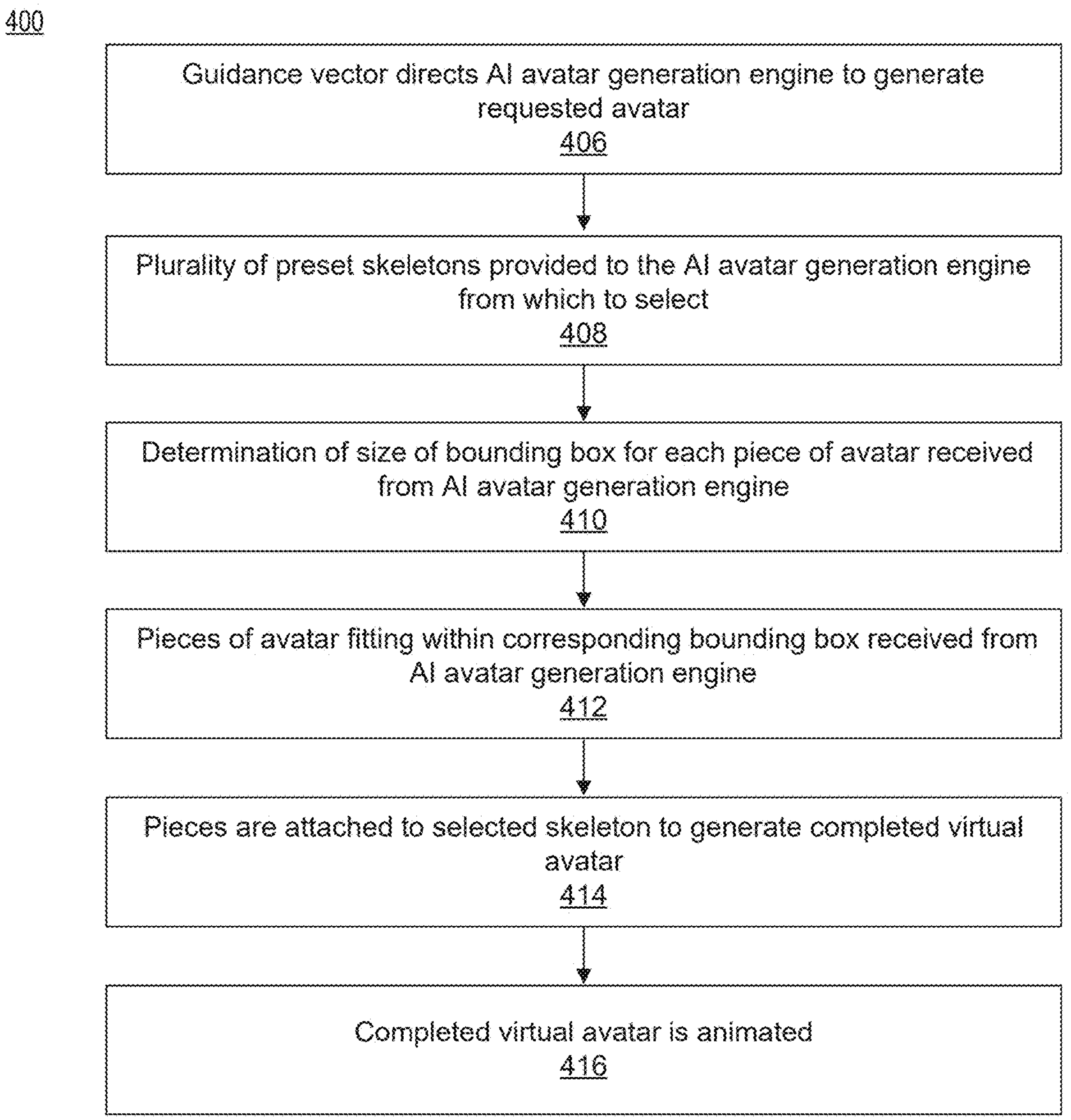
FIG. 4 is a flow diagram illustrating an example animated avatar generation method using skeleton presets, in accordance with one or more embodiments.

FIG. 4 is a flow diagram illustrating steps involved in an example animated avatar generation method using skeleton presets 400, in accordance with one or more embodiments. In step 406, a guidance vector representing a wish 102 directs the AI avatar generation engine 116 to generate a virtual avatar 108 requested in the wish 102, in the same manner as described above in step 306 in FIG. 3.

Subsequently, in step 408, a plurality of preset skeletons 106 is provided to the AI avatar generation engine 116 from which the AI avatar generation engine 116 selects an appropriate skeleton 106 for the requested virtual avatar 108. Each preset skeleton 106 is an animation rig providing information indicating how the pieces 104, which provide the visual components for the virtual avatar 108, will be arranged, as well as information dictating how those pieces 104 will move in relation to one another. In some embodiments, the plurality of presets will include humanoid anatomies, as well as shapes representing nonhuman anatomies. As an example of a nonhuman anatomy, large birds tend to have large, elongated feet and ankle joints that sit high above the ground in comparison to those of a human, creating the appearance of a "knee" that bends backwards when the large bird moves. Thus, a skeleton 106 with a high, backwards-being point of movement along the "leg" may be included among the presets to allow for the more realistic animation of virtual avatars 108 that resemble large birds.

In some embodiments, the selected skeleton 106 will additionally have an associated collection of preset animations, which may have been created specifically for a video game by its developers or a third party or acquired from an external source such as a commercial stock animation library. For example, if the avatar 108 requested is a human, the chosen skeleton 106 will be one representing human anatomy and movements and may have associated preset animations of a human performing various activities.

Subsequently, in step 410, the size of the bounding box 110 for each piece 104 that will be placed onto the skeleton 106 is received from the AI avatar generation engine 116 in the same manner as described above in step 310 of FIG. 3. Next, in step 412, generated pieces 104 fitting within the corresponding bounding boxes 110 are received from the AI avatar generation engine 116 in the same manner as described above in step 312 in FIG. 3. In step 414, the pieces 104 are aligned with the selected skeleton 106 to generate a completed virtual avatar 108. Unlike in embodiments where only one skeleton 106 is used for virtual avatars 108, in embodiments where a skeleton 106 is selected from a plurality of presets, the pieces of a virtual avatar 108 can be arranged in different configurations and move in relation to one another in more than one way depending on the skeleton 106 selected. Accordingly, a completed virtual avatar 108 has a variety of possible animated appearances, each associated with one of the skeletons 106 from the plurality of preset skeletons 106.

In some embodiments, more than one set of pieces 104 may be generated, allowing more than one completed virtual avatar 108 to be assembled. In such embodiments, each set of pieces 104 may be aligned with a different skeleton 106, allowing for multiple completed virtual avatars 108 to be generated that satisfy the wish 102 but that will have different animated movements. Finally, in step 416, the virtual avatar 108 selected by the player is animated in accordance with information provided by the selected skeleton 106 for the virtual avatar 108, allowing the player to engage in gameplay by controlling the movements of the selected virtual avatar 108.

Avatar-Related Interfaces

Figure 5:
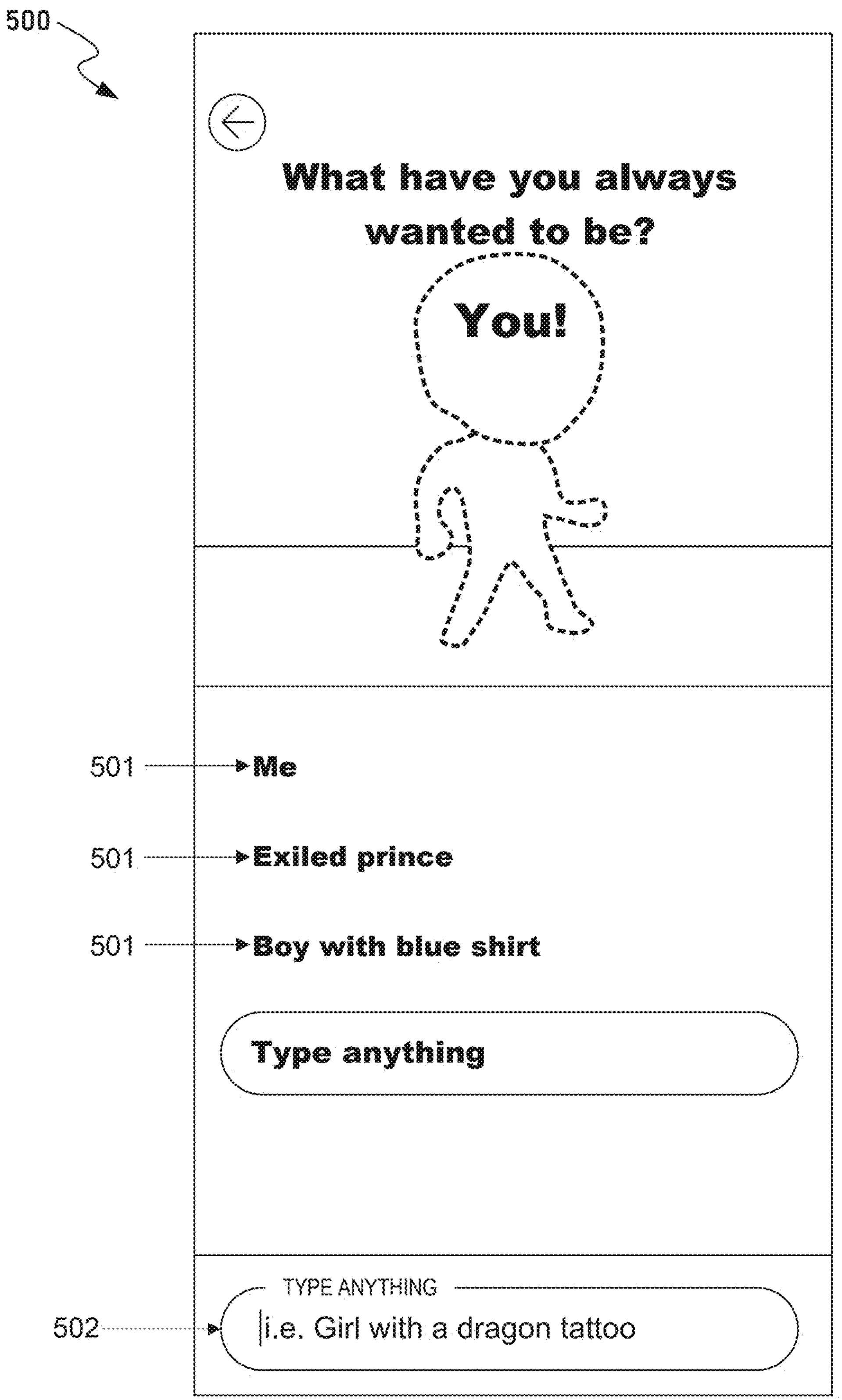
FIG. 5 illustrates a wish entering interface, in accordance with one or more embodiments.

FIG. 5 is an illustration of a wish entering interface 500, in accordance with one or more embodiments. As shown in FIG. 5, a player is provided with a text box 502 and prompted to "type anything" in the box. Example text is shown in the text box 502 to suggest the types of wishes 102 the player can make. The text the player enters in the text box 502 is processed as a wish 102 in the avatar generation system 100 described in FIG. 1.

Several wish presets 501 are also provided from which the player may select in order to generate a virtual avatar 108 satisfying that wish preset 501. When a player selects a wish preset 501, that wish preset 501 is processed in the avatar generation system 100 described in FIG. 1.

Figure 6:
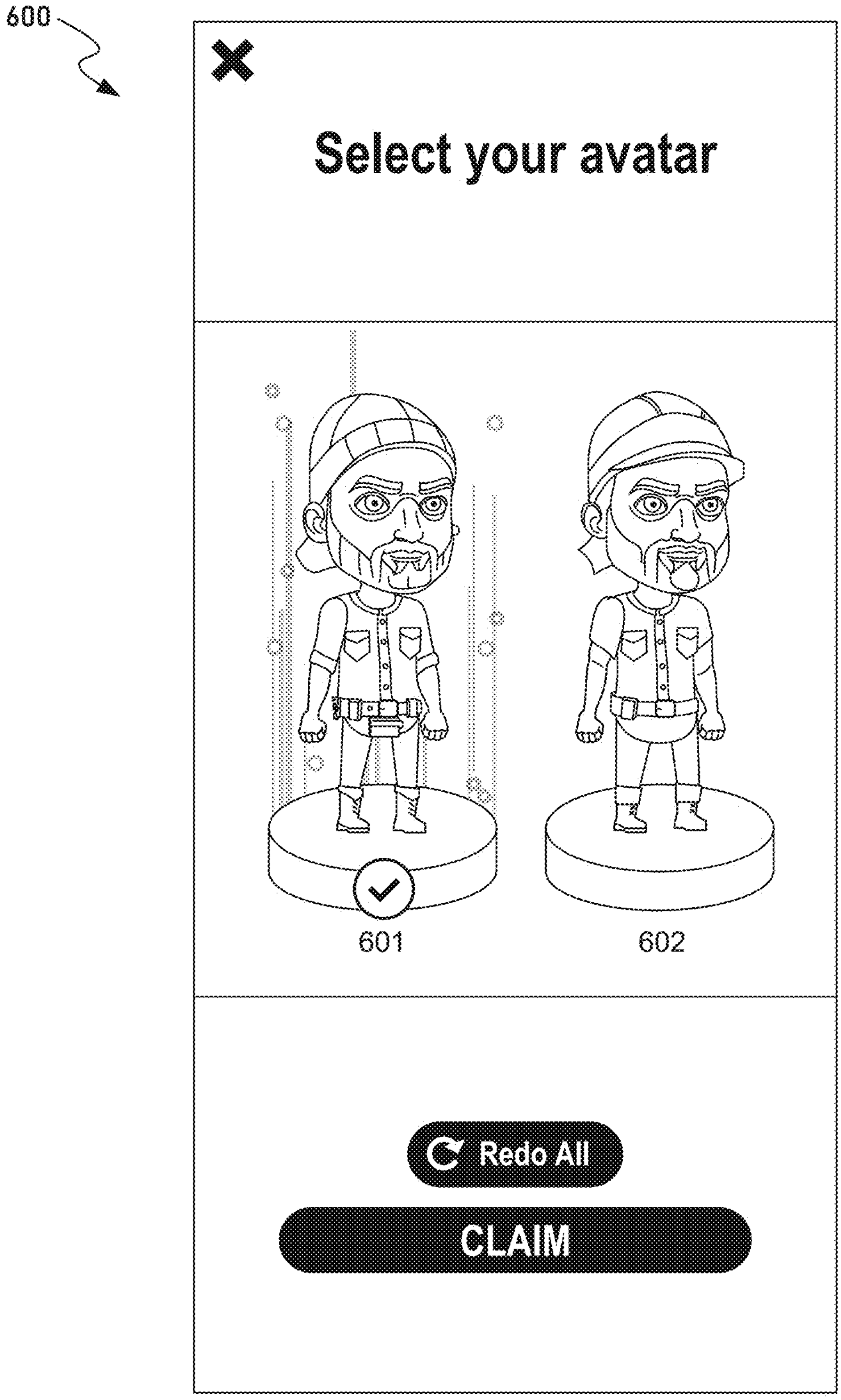
FIG. 6 illustrates an avatar selection interface, in accordance with one or more embodiments.

FIG. 6 is an illustration of an avatar selection interface 600, in accordance with one or more embodiments. In some embodiments, the player interacts with the avatar selection interface 600 via an interface 206 to select a virtual avatar 108 from a plurality of generated options. FIG. 6 illustrates an example where a wish 102 for "a lumberjack" or another similar wish 102 has been received and two different virtual avatars 108, which both satisfy the wish 102 for "a lumberjack" but vary slightly in their visual characteristics, have been generated. For example, the first lumberjack avatar 601 has a skullcap and many accessories around the belt, whereas the second lumberjack avatar 602 has a brimmed hat and less belt accessories, among other minor visual differences from the first lumberjack avatar 601. Because the AI avatar generation engine 116 can generate pieces 104 of different shapes within the tolerance allowed by the applicable bounding box 110, the generated options need not have precisely the same dimensions. For example, the first lumberjack avatar 601 and second lumberjack avatar 602 may have head pieces 104 of different shapes because of the differently shaped headwear each virtual avatar 108 is wearing. This allows for greater flexibility in creating multiple options for a virtual avatar 108 because each option is not limited to being a different coloration of a "skin" with unchanging dimensions.

In some embodiments, after multiple virtual avatars 108 are generated, the player selects the desired avatar 108 or redoes the avatar generation process such that multiple new virtual avatars 108 satisfying the wish 102 are generated. FIG. 6 illustrates an example where the first lumberjack avatar 601 has been selected by the player. In such an example, the first lumberjack avatar 601 would become the player's in-game character and would be animated to carry out the movements directed by the player.

Figure 7:
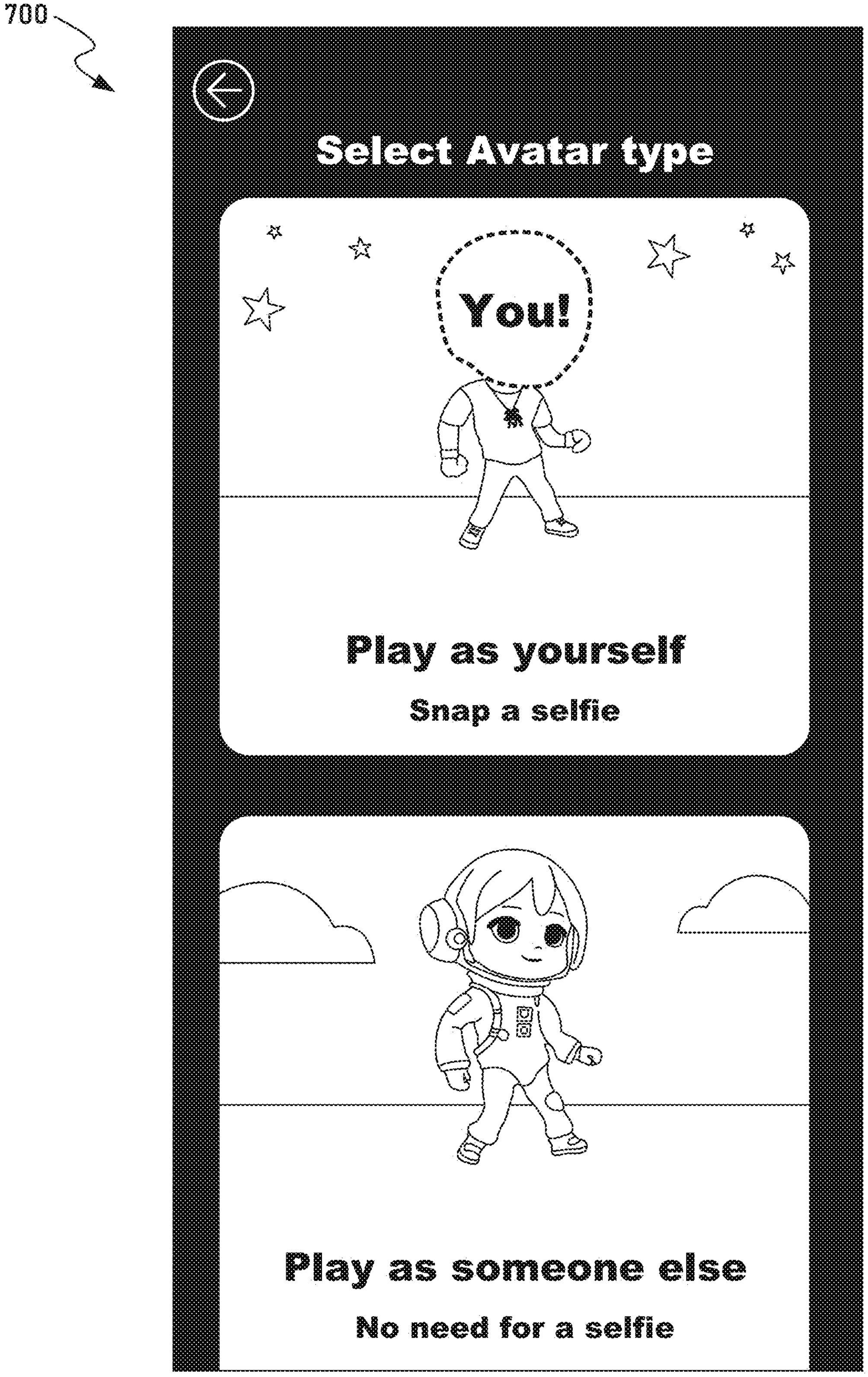
FIG. 7 illustrates an avatar type selection interface, in accordance with one or more embodiments.

FIG. 7 is an illustration of an avatar type selection interface 700, in accordance with one or more embodiments. The avatar type selection interface 700 allows the player to choose between generating a virtual avatar 108 that incorporates a selfie of the player or generating a virtual avatar 108 that is not based on the player's own appearance. A player electing to incorporate a selfie takes or uploads a photo of the player's face via a separate camera interface. This camera interface communicates information about the appearance of the player's face to the AI avatar generation engine 116, which then incorporates that information into the piece 104 it generates to represent the head of a virtual avatar 108 later requested through a wish entering interface 500, such as the one illustrated in FIG. 5.

A player electing to generate a virtual avatar 108 that is not based on the player's own appearance will not be directed to take or upload a selfie but will instead immediately be presented with a wish entering interface 500, such as the one illustrated in FIG. 5.

User Experience of Avatar Generation with a Selfie

Figure 8:
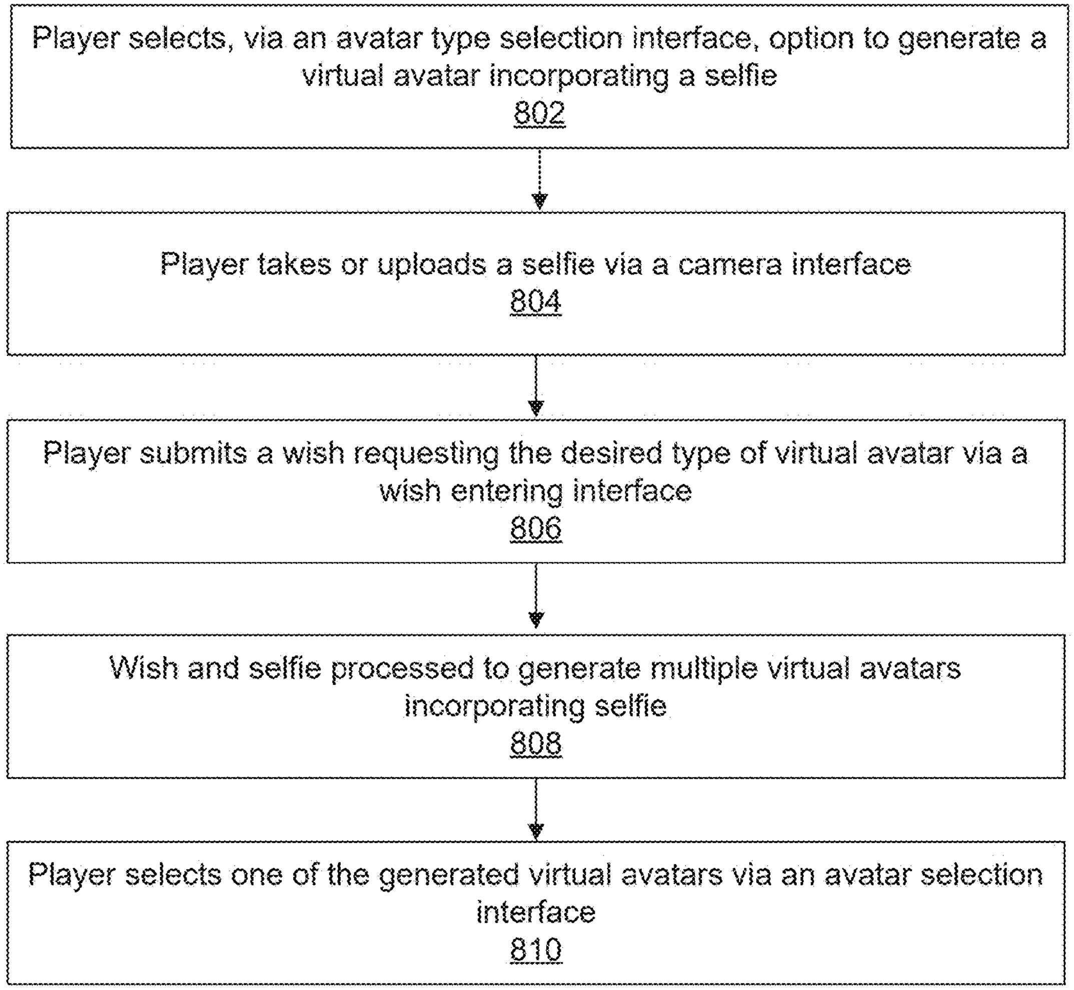
FIG. 8 depicts a diagrammatic representation of a machine in the example form of a computer system within a set of instructions, causing the machine to perform any one or more of the methodologies discussed herein, to be executed.

FIG. 8 is a flow diagram illustrating the user experience 800 of generating a virtual avatar 108 using a selfie, in accordance with one or more embodiments. In step 802, a player is presented with an avatar type selection interface 700 and selects, via that interface, an option to generate a virtual avatar 108 incorporating a selfie. An example avatar type selection interface 700 is illustrated in FIG. 7. Subsequently, in step 804, the player takes or uploads a selfie via a camera interface, which saves the captured or uploaded selfie. In some embodiments, the camera interface displays the captured or uploaded selfie to the player and asks the player to approve whether this selfie should be incorporated into the player's virtual avatar 108.

Subsequently, the player submits a wish requesting the desired type of virtual avatar via a wish entering interface 500 in step 806. An example wish entering interface 500 is illustrated in FIG. 5. The wish 102 and selfie are then processed to generate multiple virtual avatars 108 incorporating the selfie in step 808. In some embodiments, the camera interface communicates information about the appearance of the player's face extracted from the saved selfie to the AI avatar generation engine 116, which then incorporates that information into one or more head pieces 104 generated for a virtual avatar 108. The one or more head pieces 104 incorporating the player's face are then combined with one or more sets of other pieces 104 and a skeleton 106 to generate multiple virtual avatars 108. In step 810, the player is presented with the multiple virtual avatars 108 and selects one of them via an avatar selection interface 600. An example avatar selection interface is illustrated in FIG. 6. The selected virtual avatar 108 will be the one that represents the player within the video game and, in some embodiments, will be animated and/or controlled by the player during gameplay.

Computing Platform

Figure 9:
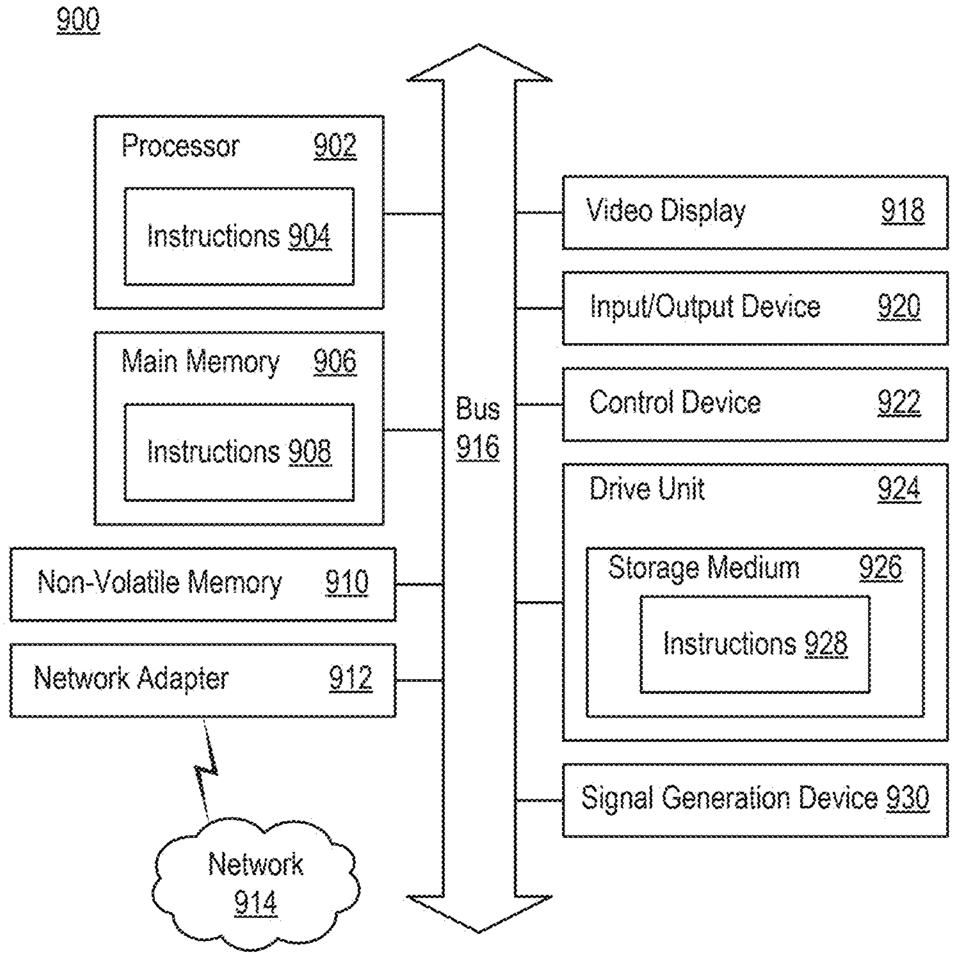
FIG. 9 is a high-level block diagram illustrating an example AI system, in accordance with one or more embodiments.

FIG. 9 is a block diagram illustrating an example computer system 900, in accordance with one or more embodiments. In some embodiments, components of the example computer system 900 are used to implement the software platforms described herein. At least some operations described herein can be implemented on the computer system 900.

In some embodiments, the computer system 900 includes one or more central processing units ("processors") 802, main memory 906, non-volatile memory 910, network adapters 912 (e.g., network interface), video displays 918, input/output devices 920, control devices 922 (e.g., keyboard and pointing devices), drive units 924 including a storage medium 926, and a signal generation device 930 that are communicatively connected to a bus 916. The bus 916 is illustrated as an abstraction that represents one or more physical buses and/or point-to-point connections that are connected by appropriate bridges, adapters, or controllers. The bus 916, therefore, includes a system bus, a peripheral component interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 794 bus (also referred to as "Firewire").

In some embodiments, the computer system 900 shares a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 900.

While the main memory 906, non-volatile memory 910, and storage medium 926 (also called a "machine-readable medium") are shown to be a single medium, the terms "machine-readable medium" and "storage medium" should be taken to include a single medium or multiple media (e.g., a centralized/distributed database and/or associated caches and servers) that store one or more sets of instructions 928. The term "machine-readable medium" and "storage medium" shall also be taken to include any medium that is capable of storing, encoding, or carrying a set of instructions for execution by the computer system 900. In some embodiments, the non-volatile memory 910 or the storage medium 926 is a non-transitory, computer-readable storage medium storing computer instructions, which is executable by the one or more processors 902 to perform functions of the embodiments disclosed herein.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 904, 908, 928) set at various times in various memory and storage devices in a computer device. When read and executed by the one or more processors 902, the instruction(s) cause the computer system 900 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually affect the distribution.

Further examples of machine-readable storage media, machine-readable media, or computer-readable media include recordable-type media such as volatile and non-volatile memory devices 910, floppy and other removable disks, hard disk drives, optical discs (e.g., compact disc read-only memory (CD-ROMS), digital versatile discs (DVDs)), and transmission-type media such as digital and analog communication links.

The network adapter 912 enables the computer system 900 to mediate data in a network 914 with an entity that is external to the computer system 900 through any communication protocol supported by the computer system 900 and the external entity. The network adapter 912 includes a network adapter card, a wireless network interface card, a router, an access point, a wireless router, a switch, a multilayer switch, a protocol converter, a gateway, a bridge, a bridge router, a hub, a digital media receiver, and/or a repeater.

In some embodiments, the network adapter 912 includes a firewall that governs and/or manages permission to access proxy data in a computer network and tracks varying levels of trust between different machines and/or applications. The firewall is any number of modules having any combination of hardware and/or software components able to enforce a predetermined set of access rights between a particular set of machines and applications, machines and machines, and/or applications and applications (e.g., to regulate the flow of traffic and resource sharing between these entities). In some embodiments, the firewall additionally manages and/or has access to an access control list that details permissions, including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc. A portion of the methods described herein can be performed using the example AI system 1000 illustrated and described in more detail with reference to FIG. 10.

AI System

Figure 10:
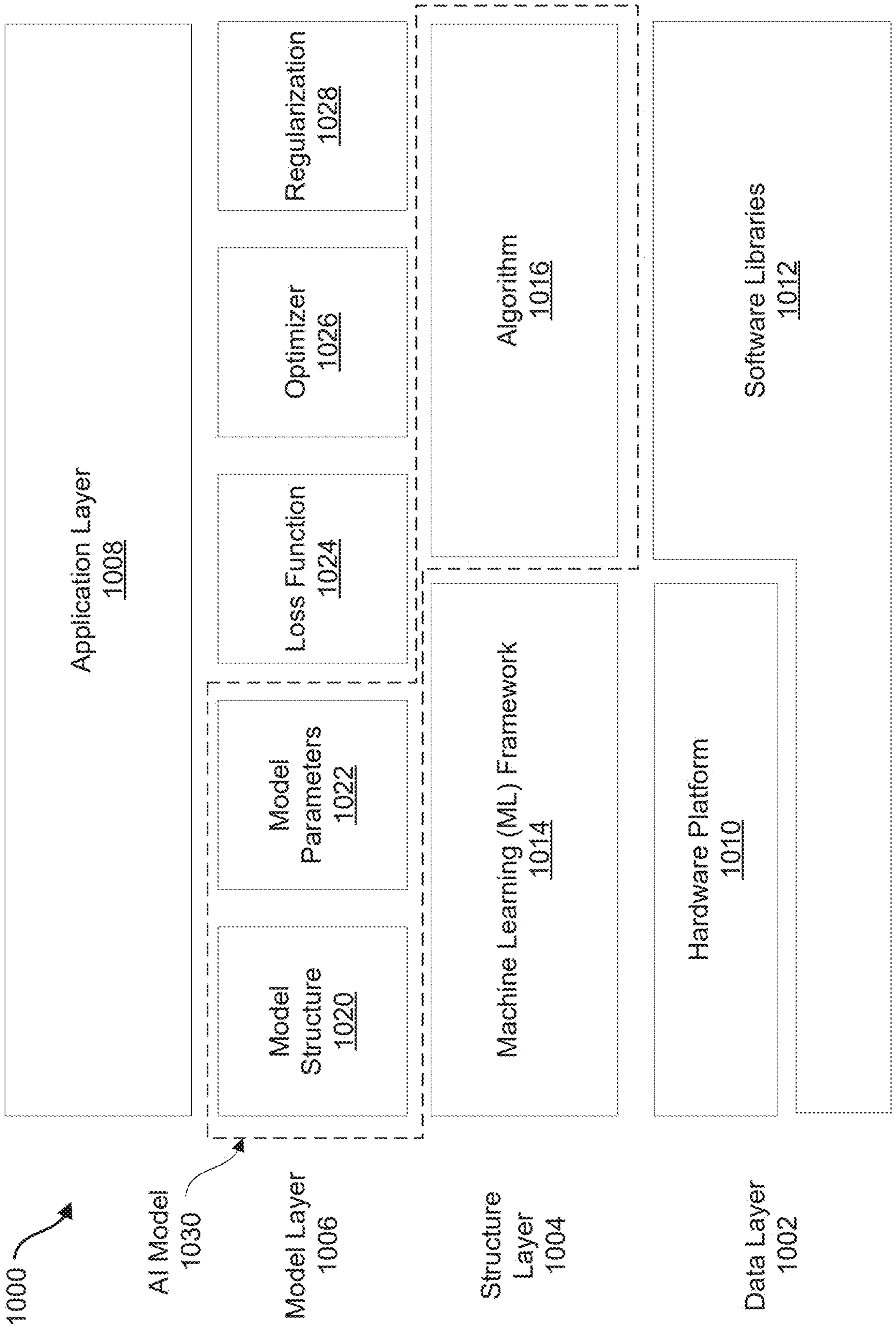
FIG. 10 is a flow diagram illustrating the user experience of generating a virtual avatar using a selfie, in accordance with one or more embodiments.

FIG. 10 is a high-level block diagram illustrating an example AI system 1000, in accordance with one or more embodiments. The AI system 1000 is implemented using components of the example computer system 900 illustrated and described in more detail with reference to FIG. 9. Likewise, embodiments of the AI system 1000 include different and/or additional components or can be connected in different ways.

In some embodiments, as shown in FIG. 10, the AI system 1000 includes a set of layers, which conceptually organize elements within an example network topology for the AI system's architecture to implement a particular AI model 1030. Generally, an AI model 1030 is a computer-executable program implemented by the AI system 1000 that analyses data to make predictions. Information passes through each layer of the AI system 1000 to generate outputs for the AI model 1030. The layers include a data layer 1002, a structure layer 1004, a model layer 1006, and an application layer 1008. The algorithm 1016 of the structure layer 1004 and the model structure 1020 and model parameters 1022 of the model layer 1006 together form the example AI model 1030. The optimizer 1026, loss function engine 1024, and regularization engine 1028 work to refine and optimize the AI model 1030, and the data layer 1002 provides resources and support for the application of the AI model 1030 by the application layer 1008.

The data layer 1002 acts as the foundation of the AI system 1000 by preparing data for the AI model 1030. As shown, in some embodiments, the data layer 1002 includes two sub-layers: a hardware platform 1010 and one or more software libraries 1012. The hardware platform 1010 is designed to perform operations for the AI model 1030 and includes computing resources for storage, memory, logic, and networking. The hardware platform 1010 processes data using one or more servers. The servers can perform back-end operations such as matrix calculations, parallel calculations, machine learning (ML) training, and the like. Examples of servers used by the hardware platform 1010 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 1010 includes Infrastructure as a Service (IaaS) resources, which are computing resources (e.g., servers, memory, etc.) offered by a cloud services provider. In some embodiments, the hardware platform 1010 includes computer memory for storing data about the AI model 1030, application of the AI model 1030, and training data for the AI model 1030. In some embodiments, the computer memory is a form of random-access memory (RAM), such as dynamic RAM, static RAM, and non-volatile RAM.

In some embodiments, the software libraries 1012 are thought of as suites of data and programming code, including executables, used to control the computing resources of the hardware platform 1010. In some embodiments, the programming code includes low-level primitives (e.g., fundamental language elements) that form the foundation of one or more low-level programming languages such that servers of the hardware platform 1010 can use the low-level primitives to carry out specific operations. The low-level programming languages do not require much, if any, abstraction from a computing resource's instruction set architecture, allowing them to run quickly with a small memory footprint. Examples of software libraries 1012 that can be included in the AI system 1000 include Intel Math Kernel Library, Nvidia cuDNN, Eigen, and Open BLAS.

In some embodiments, the structure layer 1004 includes an ML framework 1014 and an algorithm 1016. The ML framework 1014 can be thought of as an interface 206, library, or tool that allows users to build and deploy the AI model 1030. In some embodiments, the ML framework 1014 includes an open-source library, an application programming interface (API), a gradient-boosting library, an ensemble method, and/or a deep learning toolkit that works with the layers of the AI system to facilitate development of the AI model 1030. For example, the ML framework 1014 distributes processes for the application or training of the AI model 1030 across multiple resources in the hardware platform 1010. In some embodiments, the ML framework 1014 also includes a set of pre-built components that have the functionality to implement and train the AI model 1030 and allow users to use pre-built functions and classes to construct and train the AI model 1030. Thus, the ML framework 1014 can be used to facilitate data engineering, development, hyperparameter tuning, testing, and training for the AI model 1030. Examples of ML frameworks 1014 that can be used in the AI system 1000 include TensorFlow, PyTorch, scikit-learn, Keras, Caffe, LightGBM, Random Forest, and Amazon Web Services.

In some embodiments, the algorithm 1016 is an organized set of computer-executable operations used to generate output data from a set of input data and can be described using pseudocode. In some embodiments, the algorithm 1016 includes complex code that allows the computing resources to learn from new input data and create new/modified outputs based on what was learned. In some implementations, the algorithm 1016 builds the AI model 1030 through being trained while running computing resources of the hardware platform 1010. The training allows the algorithm 1016 to make predictions or decisions without being explicitly programmed to do so. Once trained, the algorithm 1016 runs at the computing resources as part of the AI model 1030 to make predictions or decisions, improve computing resource performance, or perform tasks. The algorithm 1016 is trained using supervised learning, unsupervised learning, semi-supervised learning, and/or reinforcement learning.

The application layer 1008 describes how the AI system 1000 is used to solve problems or perform tasks. In an example implementation, the application layer 1008 includes the AI avatar generation engine 116.

As an example, to train an AI model 1030 that is intended to generate images, the data layer 1002 is a dataset of image-text pairs. The dataset represents a text domain (e.g., a caption corresponding to the image), a language domain (e.g., the language the caption is written in), and/or encompasses another domain or domains, be they larger or smaller than a single text or language domain. For example, a relatively large and non-subject-specific dataset is created by extracting images from online web pages and/or publicly available social media posts and associating text captions with those images.

Training an AI model 1030 generally involves inputting into an AI model 1030 (e.g., an untrained ML model) data layer 1002 to be processed by the AI model 1030, processing the data layer 1002 using the AI model 1030, collecting the output generated by the AI model 1030 (e.g., based on the inputted training data), and comparing the output to a desired set of target values. In some embodiments, the desired target value is a reconstructed (or otherwise processed) version of the corresponding AI model 1030 input or a variation on said input. The parameters of the AI model 1030 are updated based on a difference between the generated output value and the desired target value. For example, if the value outputted by the AI model 1030 is excessively noisy, the parameters are adjusted so as to lower the noise value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the AI model 1030 typically is to minimize a loss function or maximize a reward function.

In some embodiments, the data layer 1002 is a subset of a larger dataset. For example, a dataset is split into three mutually exclusive subsets: a training set, a validation (or cross-validation) set, and a testing set. The three subsets of data, in some embodiments, are used sequentially during AI model 1030 training. For example, the training set is first used to train one or more ML models, each AI model 1030, e.g., having a particular architecture, having a particular training procedure, being describable by a set of model hyperparameters, and/or otherwise being varied from the other of the one or more ML models. The validation (or cross-validation) set, in some embodiments, is then used as input data into the trained ML models to, e.g., measure the performance of the trained ML models and/or compare performance between them. In some embodiments, where hyperparameters are used, a new set of hyperparameters is determined based on the measured performance of one or more of the trained ML models, and the first step of training (i.e., with the training set) begins again on a different ML model described by the new set of determined hyperparameters. These steps are repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) begins in some embodiments. The output generated from the testing set, in some embodiments, is compared with the corresponding desired target values to give a final assessment of the trained ML model's accuracy. Other segmentations of the larger dataset and/or schemes for using the segments for training one or more ML models are possible.

Backpropagation is an algorithm for training an AI model 1030. Backpropagation is used to adjust (also referred to as update) the value of the parameters in the AI model 1030, with the goal of optimizing the objective function. For example, a defined loss function is calculated by forward propagation of an input to obtain an output of the AI model 1030 and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. In some embodiments, other techniques for learning the parameters of the AI model 1030 are used. The process of updating (or learning) the parameters over many iterations is referred to as training. In some embodiments, training is carried out iteratively until a convergence condition is met (e.g., a predefined maximum number of iterations has been performed, or the value outputted by the AI model 1030 is sufficiently converged with the desired target value), after which the AI model 1030 is considered to be sufficiently trained. The values of the learned parameters are then fixed, and the AI model 1030 is then deployed to generate output in real-world applications (also referred to as "inference").

In some examples, a trained ML model is fine-tuned, meaning that the values of the learned parameters are adjusted slightly in order for the ML model to better model a specific task. Fine-tuning of an AI model 1030 typically involves further training the ML model on a number of data samples (which may be smaller in number/cardinality than those used to train the model initially) that closely target the specific task. For example, an AI model 1030 for generating images that has been trained generically on publicly available image-text pairs is, e.g., fine-tuned by further training using specific training samples. In some embodiments, the specific training samples are used to generate images in a certain style or a certain format. For example, the AI model 1030 is trained to generate an image of a dog having a particular style (e.g., watercolor) and pose (e.g., sitting).

Some concepts in ML-based diffusion models are now discussed. It may be noted that while the term "diffusion model" has been commonly used to refer to an ML-based diffusion model, there could exist non-ML diffusion models. In the present disclosure, the term "diffusion model" may be used as shorthand for an ML-based language model (i.e., a diffusion model that is implemented using a neural network or other ML architecture) unless stated otherwise.

In some embodiments, the diffusion model uses an embedded language model to process a wish 102. Language models use a neural network (typically a DNN) to perform natural language processing ("NLP") tasks. A language model is trained to model how words relate to each other in a textual sequence based on probabilities. In some embodiments, the language model contains hundreds of thousands of learned parameters, or in the case of a large language model (LLM), the LLM contains millions or billions of learned parameters or more.

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Although a general transformer architecture for a language model and the model's theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that is considered to be an encoder-only language model. A decoder-only language model accepts embeddings as input and uses auto-regression to generate an output text sequence. Transformer-XL and GPT-type models are language models that are considered to be decoder-only language models.

In some embodiments, an input to a diffusion model is referred to as a prompt, which is a natural language input that includes instructions to the diffusion model to generate a desired output. In some embodiments, a computer system generates a prompt that is provided as input to the diffusion model via the diffusion model's API. As described above, the prompt is then processed by an embedded language model. A prompt includes one or more examples of the desired output, which provides the diffusion model with additional information to enable the diffusion model to generate output according to the desired output. Additionally or alternatively, the examples included in a prompt provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples is referred to as a zero-shot prompt.

In some embodiments, the language model embedded in the diffusion model processes a wish 102 into a guidance vector containing information regarding the type of image to be generated. The diffusion model then receives an input tensor, which is typically an image of randomly generated noise. Through a process of denoising, noise is gradually removed from the input tensor in a manner specified by the guidance vector. The denoising process continues until the resulting image resembles the type of image specified by the wish 102. The diffusion model then provides the resulting image as output. In embodiments where the input tensor is randomly generated, the diffusion model can produce various outputs using the same wish 102 as input.

A computer system can access a remote diffusion model (e.g., a cloud-based language model), such as Dall-E 2, via a software interface (e.g., an API). Additionally or alternatively, such a remote diffusion model can be accessed via a network such as, for example, the Internet. In some implementations, such as, for example, potentially in the case of a cloud-based diffusion model, a remote diffusion model is hosted by a computer system that includes a plurality of cooperating (e.g., cooperating via a network) computer systems that are in, for example, a distributed arrangement. Notably, a remote diffusion model employs a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

In some embodiments, Stable Diffusion is used as a diffusion model, which is a latent diffusion model. During training, noise is added to an image and the model then predicts the parts of the image containing noise. The model attempts to remove noise from the image until an image resembling the original image without noise is recovered.

In some embodiments, Dall-E 2 is used as a diffusion model, which is a diffusion model having a similar architecture to Stable Diffusion. Dall-E 2 uses a transformer-based neural network to process text queries.

In some embodiments, Midjourney is used as a diffusion model, which is a diffusion model having a similar architecture to Stable Diffusion and Dall-E 2.

Alternative language and synonyms can be used for any one or more of the terms discussed herein, and no special significance is to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

From the foregoing, it will be appreciated that specific embodiments of the invention have been described herein for purposes of illustration but that various modifications may be made without deviating from the scope of the invention. Accordingly, the invention is not limited except as by the appended claims.

We claim:

1. A method of generating a virtual avatar, the method comprising:

receiving, by a processor, a wish from a player requesting the virtual avatar, wherein the wish is a user input including a natural language description of the virtual avatar;

directing, by the processor, using example information from a pre-compiled database of virtual visual designs, an artificial intelligence (AI) avatar generation engine to generate the virtual avatar, wherein the example information is retrieved from the pre-compiled database using a retrieval-augmented generation (RAG) framework;

receiving, by the processor, from the AI avatar generation engine, a piece of the virtual avatar, wherein the piece fits within a bounding box, and wherein the bounding box has a size set of dimensions based on the example information that bounds the piece to avoid overlap with other visual elements of the virtual avatar; and aligning, by the processor, the piece of the virtual avatar with a predetermined animation rig of the virtual avatar, wherein the predetermined animation rig includes a predetermined set of animated movements of the virtual avatar.

2. The method of claim 1, further comprising:

receiving, by the processor, a selection from the player of an option to incorporate a selfie, wherein the selection is received via an avatar type selection interface;

receiving, by the processor, the selfie uploaded via a camera interface;

processing, by the processor, the selfie to extract information about a face appearing in the selfie; and directing the AI avatar generation engine to incorporate the extracted information into the virtual avatar.

3. The method of claim 2, further comprising:

directing, by the processor, using the extracted information, the AI avatar generation engine to generate a second virtual avatar;

receiving, by the processor, from the AI avatar generation engine, one or more pieces of the second virtual avatar, wherein each piece of the second virtual avatar has a corresponding bounding box;

aligning, by the processor, each piece of the second virtual avatar with a second predetermined animation rig, wherein the second predetermined animation rig includes a second predetermined set of animated movements of the second virtual avatar;

causing display, by the processor, of an avatar selection interface to the player; and receiving, by the processor, a second selection by the player of either the virtual avatar or the second virtual avatar via the avatar selection interface.

4. The method of claim 1, further comprising:

directing, by the processor, using the example information, the AI avatar generation engine to generate a second virtual avatar;

receiving, by the processor, from the AI avatar generation engine, one or more pieces of the second virtual avatar, wherein each piece of the second virtual avatar has a corresponding bounding box;

aligning, by the processor, each piece of the second virtual avatar with a second predetermined animation rig, wherein the second predetermined animation rig includes a second predetermined set of animated movements of the second virtual avatar;

causing display, by the processor, of an avatar selection interface to the player; and receiving, by the processor, a selection by the player of either the virtual avatar or the second virtual avatar via the avatar selection interface.

5. The method of claim 1, wherein:

the wish is received via a wish entering interface, the wish entering interface comprising at least one of:

a text box for entering text to be processed as the wish, a wish preset that is processed as the wish when selected by the player, or example text suggesting the wish be made by the player.

6. The method of claim 1, further comprising:

providing, by the processor, the AI avatar generation engine with a plurality of predetermined animation rigs, wherein each predetermined animation rig in the plurality of predetermined animation rigs provides different information associated with a particular predetermined set of animated movements of the virtual avatar; and receiving, by the processor, a selection of the predetermined animation rig from the plurality of predetermined animation rigs by the AI avatar generation engine.

7. The method of claim 1, further comprising:

generating, by the processor, a guidance vector based on the wish, the guidance vector indicative of information about the virtual avatar; and directing, by the processor, using the guidance vector, the AI avatar generation engine to generate the virtual avatar.

8. One or more non-transitory, computer-readable storage media comprising instructions recorded thereon, wherein the instructions, when executed by at least one data processor of a system, cause the system to:

receive a wish from a player requesting a virtual avatar, wherein the wish is a user input including a natural language description of the virtual avatar;

process the wish into a guidance vector indicative of information about the virtual avatar;

direct, using the guidance vector, an AI avatar generation engine to generate the virtual avatar;

receive, from the AI avatar generation engine, a piece of the virtual avatar, wherein the piece fits within a bounding box, and wherein the bounding box has a set of dimensions that bounds the piece to avoid overlap with other visual elements of the virtual avatar; and align the piece of the virtual avatar with a predetermined animation rig of the virtual avatar, wherein the predetermined animation rig includes a predetermined set of animated movements of the virtual avatar.

9. The one or more non-transitory, computer-readable storage media of claim 8, wherein the instructions further cause the system to:

receive a selection from the player of an option to incorporate a selfie, wherein the selection is received via an avatar type selection interface;

receive the selfie uploaded via a camera interface;

process the selfie to extract information about a face appearing in the selfie; and direct the AI avatar generation engine to incorporate the extracted information into the virtual avatar.

10. The one or more non-transitory, computer-readable storage media of claim 9, wherein the instructions further cause the system to:

direct, using the guidance vector and extracted information, the AI avatar generation engine to generate a second virtual avatar;

receive, from the AI avatar generation engine, one or more pieces of the second virtual avatar, wherein each piece of the second virtual avatar has a corresponding bounding box;

align each piece of the second virtual avatar with a second predetermined animation rig, wherein the second predetermined animation rig includes a second predetermined set of animated movements of the second virtual avatar;

cause display of an avatar selection interface to the player; and receive a second selection by the player of either the virtual avatar or the second virtual avatar via the avatar selection interface.

11. The one or more non-transitory, computer-readable storage media of claim 8, wherein the instructions further cause the system to:

direct, using the guidance vector, the AI avatar generation engine to generate a second virtual avatar;

receive, from the AI avatar generation engine, one or more pieces of the second virtual avatar, wherein each piece of the second virtual avatar has a corresponding bounding box;

align each piece of the second virtual avatar with a second predetermined animation rig, wherein the second predetermined animation rig includes a second predetermined set of animated movements of the second virtual avatar;

cause display of an avatar selection interface to the player; and receive a selection by the player of either the virtual avatar or the second virtual avatar via the avatar selection interface.

12. The one or more non-transitory, computer-readable storage media of claim 8, wherein:

directing the AI avatar generation engine to generate the virtual avatar includes providing the AI avatar generation engine with example information from a precompiled database of virtual visual designs, wherein the example information is retrieved from the precompiled database using a retrieval-augmented generation (RAG) framework, and wherein the set of dimensions of the bounding box determined by the AI avatar generation engine is based on the example information.

13. A method of generating a virtual avatar, the method comprising:

receiving, by a processor, a wish from a player requesting the virtual avatar, wherein the wish is a user input including a natural language description of the virtual avatar;

directing, by the processor, an AI avatar generation engine to generate the virtual avatar based on the wish;

receiving, by the processor, from the AI avatar generation engine, a piece of the virtual avatar, wherein the piece fits within a bounding box, and wherein the bounding box has a set of dimensions that bounds the piece to avoid overlap with other visual elements of the virtual avatar; and aligning, by the processor, the piece of the virtual avatar with a predetermined animation rig of the virtual avatar, wherein the predetermined animation rig includes a predetermined set of animated movements of the virtual avatar.

14. The method of claim 13, further comprising:

providing, by the processor, the AI avatar generation engine with a plurality of predetermined animation rigs, wherein each predetermined animation rig in the plurality of predetermined animation rigs provides different information associated with a particular predetermined set of animated movements of the virtual avatar;

receiving, by the processor, a selection of the predetermined animation rig from the plurality of predetermined animation rigs by the AI avatar generation engine; and aligning, by the processor, the piece of the virtual avatar with the selected predetermined animation rig.

15. The method of claim 13, further comprising:

receiving, by the processor, a selection from the player of an option to incorporate a selfie, wherein the selection is received via an avatar type selection interface;

receiving, by the processor, the selfie uploaded via a camera interface;

processing, by the processor, the selfie to extract information about a face appearing in the selfie; and directing, by the processor, the AI avatar generation engine to incorporate the extracted information into the virtual avatar.

16. The method of claim 15, further comprising:

directing, by the processor, using the extracted information, the AI avatar generation engine to generate a second virtual avatar;

receiving, by the processor, from the AI avatar generation engine, one or more pieces of the second virtual avatar, wherein each piece of the second virtual avatar has a corresponding bounding box;

aligning, by the processor, each piece of the second virtual avatar with a second predetermined animation rig, wherein the second predetermined animation rig includes a second predetermined set of animated movements of the second virtual avatar;

causing display, by the processor, of an avatar selection interface to the player; and receiving, by the processor, a second selection by the player of either the virtual avatar or the second virtual avatar via the avatar selection interface.

17. The method of claim 13, further comprising:

directing, by the processor, the AI avatar generation engine to generate a second virtual avatar;

receiving, by the processor, from the AI avatar generation engine, one or more pieces of the second virtual avatar, wherein each piece of the second virtual avatar has a corresponding bounding box;

aligning, by the processor, each piece of the second virtual avatar with a second predetermined animation rig, wherein the second predetermined animation rig includes a second predetermined set of animated movements of the second virtual avatar;

causing display, by the processor, of an avatar selection interface to the player; and receiving, by the processor, a selection by the player of either the virtual avatar or the second virtual avatar via the avatar selection interface.

18. The method of claim 13, wherein:

the wish is received via a wish entering interface, the wish entering interface comprising at least one of:

a text box for entering text to be processed as the wish, a wish preset that is processed as the wish when selected by the player, or example text suggesting the wish be made by the player.

19. The method of claim 13, wherein:

the AI avatar generation engine is directed via a guidance vector containing information about the virtual avatar; and wherein the set of dimensions of the bounding box is determined by the AI avatar generation engine based on the guidance vector.

20. The method of claim 13, wherein:

directing the AI avatar generation engine to generate the virtual avatar includes providing the AI avatar generation engine with example information from a pre-compiled database of virtual visual designs, wherein the example information is retrieved from the pre-compiled database using a retrieval-augmented generation (RAG) framework, and wherein the set of dimensions of the bounding box determined by the AI avatar generation engine is based on the example information.

* * * * *